(12) United States Patent
Mccann et al.

(10) Patent No.: US 10,992,814 B1
(45) Date of Patent: Apr. 27, 2021

(54) VARIABLE PHONE SELECTION OPTIONS BASED ON LOCATION

(71) Applicant: Cisco Technology, Inc., San Jose, CA (US)

(72) Inventors: Alan Mccann, Galway (IE); Kenneth James Ward, Acton, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/520,864

(22) Filed: Jul. 24, 2019

Related U.S. Application Data (60) Provisional application No. 62/851,011, filed on May 21, 2019.

(51) Int. Cl.
 *H04M 7/00* (2006.01)
 *H04W 4/029* (2018.01)
(52) U.S. Cl.
 CPC ......... *H04M 7/0012* (2013.01); *H04W 4/029* (2018.02)
(58) Field of Classification Search
 CPC combination set(s) only.
 See application file for complete search history.

(56) References Cited

U.S. PATENT DOCUMENTS

| 6,263,072 | B1 * | 7/2001 | Booton | ............ | H04M 3/42314 |
| | | | | | 379/106.09 |
| 2013/0267242 | A1 * | 10/2013 | Curticapean | .......... | G01S 5/0242 |
| | | | | | 455/456.1 |

* cited by examiner

*Primary Examiner* — Amal S Zenati
(74) *Attorney, Agent, or Firm* — Polsinelli PC (57) ABSTRACT

A computing device can detect that a first call has taken place on a desk phone, which triggers recording of location-specific information indicating a location of the computing device. The location-specific information can be established as the base of the desk phone. Later, the computing device can again record location-specific information indicating a current location of the computing device and compare the current location of the computing device with the location-specific information for the location of the desk phone. When the current location of the computing device is substantially the same as the location of the desk phone, the computing device can enable computer telephony integration (CTI) controls on the computing device to control the desk phone.

20 Claims, 8 Drawing Sheets

VARIABLE PHONE SELECTION OPTIONS BASED ON LOCATION

CROSS REFERENCE TO RELATED APPLICATIONS

This application claims priority to U.S. provisional application No. 62/851,011, filed on May 21, 2019, which is expressly incorporated by reference herein in its entirety.

TECHNICAL FIELD

The present technology pertains to selecting a device to control based on a location of a user's computing device, and more specifically pertains to automatically enabling computer-telephony integration (CTI) controls when a user's computing device is proximate to the desk phone.

BACKGROUND

A feature of Voice Over Internet Protocol (VoIP) phones is that they can be controlled from applications on a computing device such as a laptop or mobile phone. Such services are called computer-telephony integration (CTI). A user can select a contact on their computing device but have the call connected on their desk phone. Likewise, a user can answer a call using an interface on their computing device, but have the call connected through their desk phone. In some cases, a user can transfer a call that is connected through their desk phone to a mobile phone or other computing device if the user needs to leave their desk.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

A computing device can detect that a first call has taken place on a desk phone, which triggers recording of location information indicating a location of the computing device. The location information can be established as the base of the desk phone. Later, the computing device can again record location information indicating a current location of the computing device and compare the current location of the computing device with the location information for the location of the desk phone. When the current location of the computing device is substantially the same as the location of the desk phone, the computing device can enable computer telephony integration (CTI) controls on the computing device to control the desk phone.

When the current location of the computing device is not substantially the same as the location of the desk phone, the computing device can not enable, or disable, computer telephony integration (CTI) controls on the computing device to control the desk phone.

EXAMPLE EMBODIMENTS

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for a technology to determine when a computing device having a computer-telephony integration (CTI) application is proximate to a phone controlled by the CTI application. Most desk phones do not have capabilities to announce its presence to nearby devices, and therefore, computing devices with CTI applications are unaware of whether a desk phone that can be managed by the CTI application is nearby.

Since a CTI application is unaware of whether a desk phone that can be managed by the CTI application is nearby, a known problem occurs when users who have their CTI application configured to control their desk phone in the office, spend their day answering calls on their desk phone through the application, and then go home or move away from their desk phone to another part of the office, receive an incoming call and inadvertently answer the call on their desk phone. They are then forced to use CTI application to hang up the call as they cannot see or hear the far end and then dial the person back. This leads to a broken and confusing experience for both caller and callee.

Figure 1:
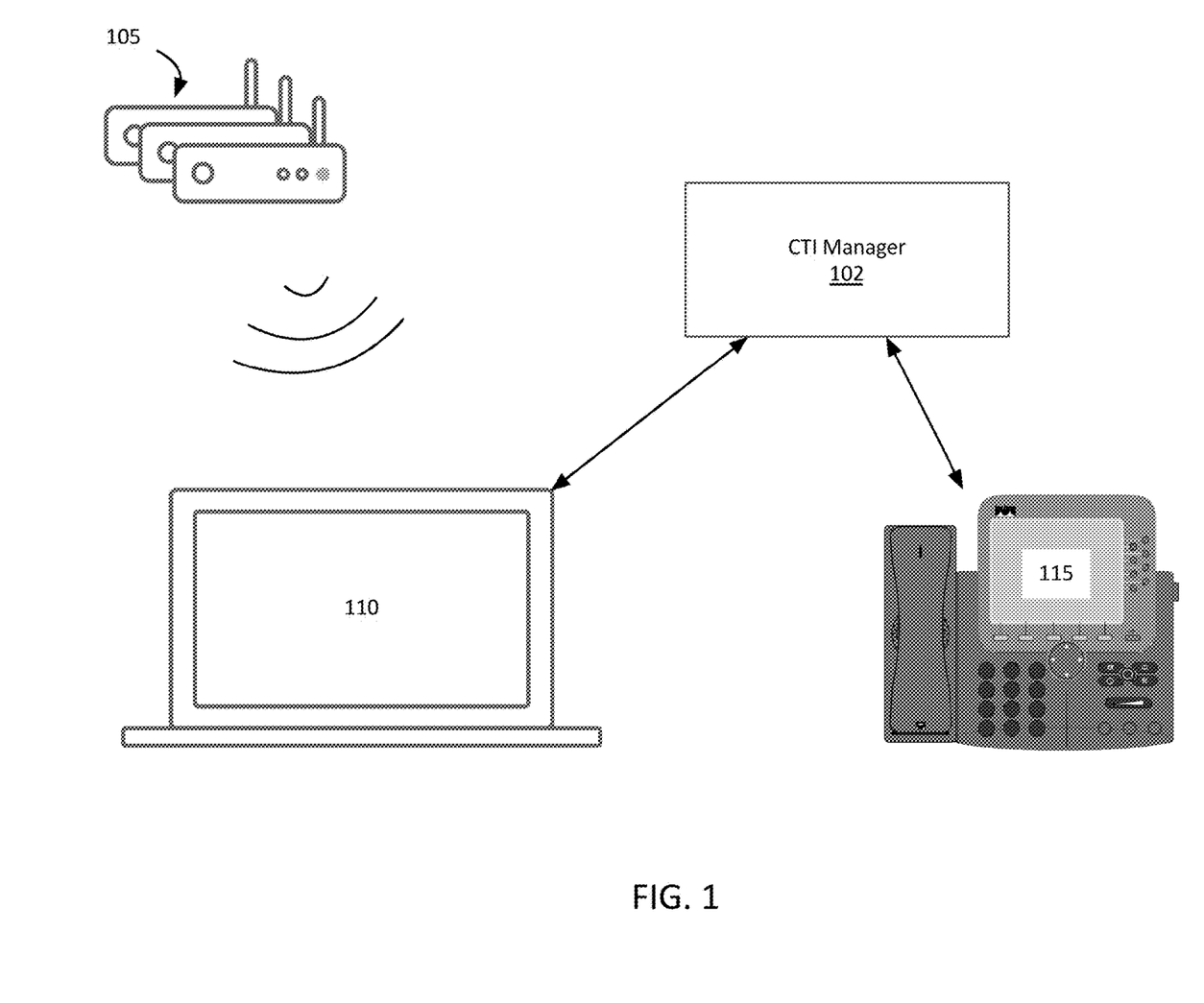
FIG. 1 illustrates an example system embodiment in accordance with some aspects of the present technology.

FIG. 1 illustrates an example system embodiment, wherein desk phone 115 can be controlled by computing device 110 using a computer-telephony integration (CTI) application. Computing device 110 can be linked to (a wired) desk phone 115 through CTI manager 102.

CTI manager 102 is a server that is used to associate endpoints such as desk phone 115 and computing device 110 with a phone number so that both devices are notified when there is an incoming call as illustrated in FIG. 1. When computing device 110 receives a notification that there is an incoming call, computing device 110 can present an option in its user interface to choose where to answer the incoming call. For example, the user can choose to answer the incoming call from their computing device 110 or from the desk phone 115. Likewise, CTI manager 102 can enable functionality for a user to look up a contact on their computing device 110 and select to call the contact, but to place the call using their desk phone 115.

Figure 2:
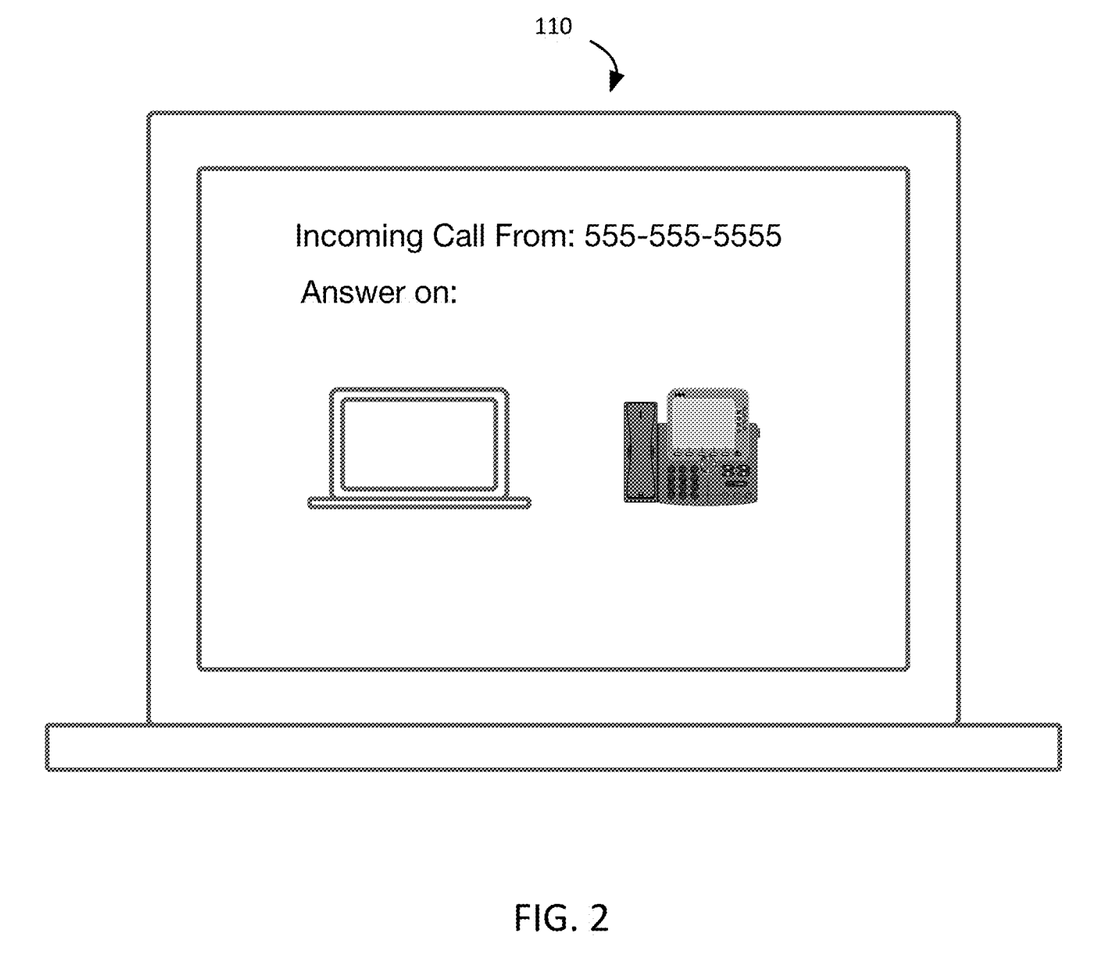
FIG. 2 illustrates an example graphical user interface embodiment for selecting a device through which to connect a call, in accordance with some aspects of the present technology.

CTI manager 102 can also enable functionality for a user to transfer a call that is currently routed to desk phone 115 and can transfer that call to computing device 110 so that the user can continue the call while they walk away from their desk. While FIG. 1 and FIG. 2 illustrate computing device 110 as a laptop, it should be appreciated that computing device 110 can take any form of computing device including a mobile phone or tablet or other device.

As noted above, one common problem with CTI applications is that a user might be given an option to control a device that is not nearby, or a device that is nearby is not provided as an option in the user interface. The present technology solves this problem by determining when computing device 110 is proximate to desk phone 115 by using location-specific information derived from signal strength indicators for detected wireless access points 105.

Figure 3:
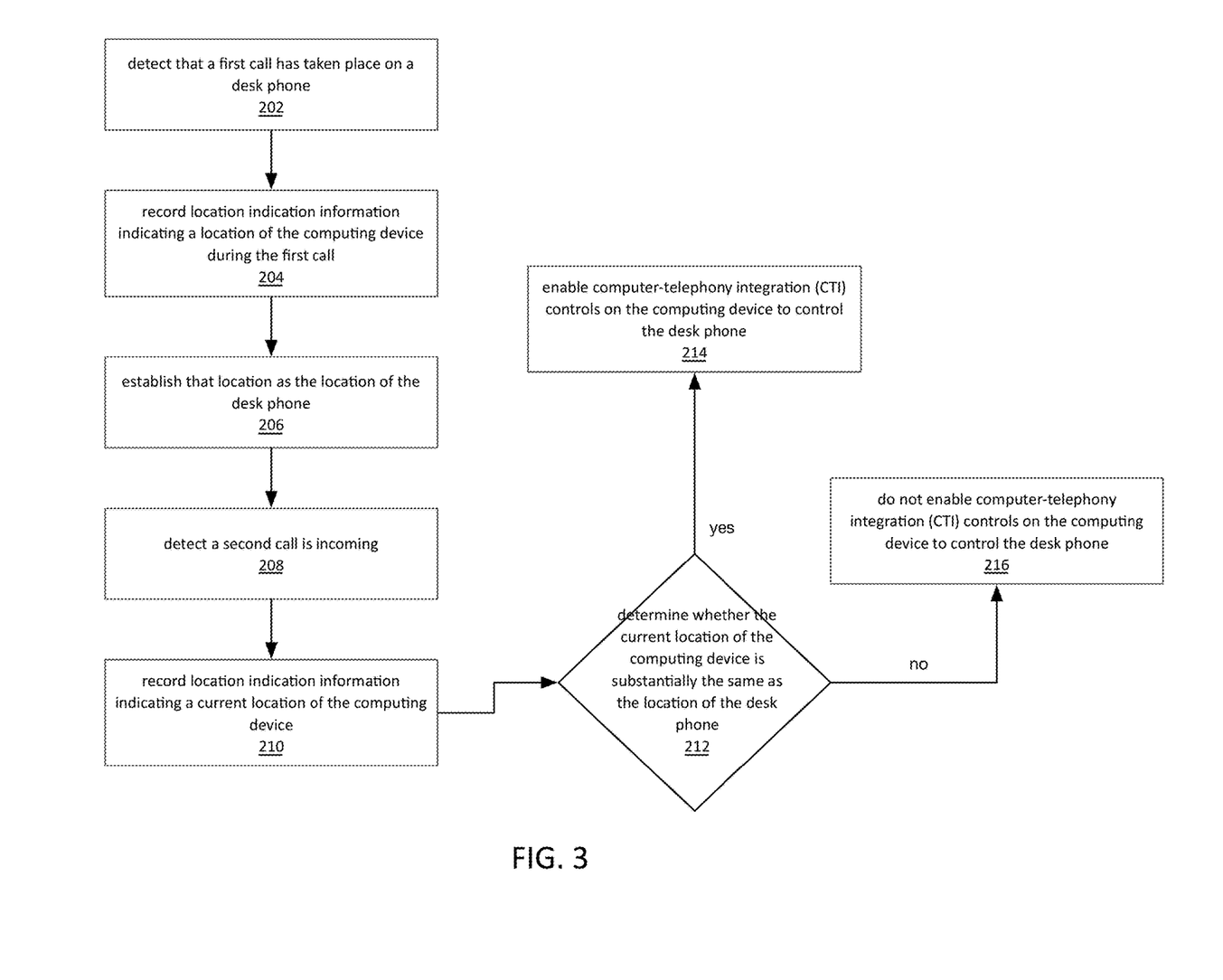
FIG. 3 illustrates an example method embodiment for modifying a phone selection option based on proximity to a desk phone in accordance with some aspects of the present technology.

FIG. 3 illustrates an example method for determining whether a desk phone 115 should be presented as an option to handle an incoming or outgoing call in a CTI application on computing device 110.

First the CTI application on computing device 110 must learn the location of desk phone 115. This can be achieved when computing device 110 detects (202) that a call is currently being conducted on desk phone 115. The computing device can make such a detection (202) with help from CTI manager 102, which can alert computing device 110 that the call is being conducted on desk phone 115.

Once the CTI application on computing device 110 has detected (202) that a first call has taken place on desk phone 115, the CTI application on computing device 110 can record (204) location-specific information indicating a location of the computing device during the first call.

The location-specific information can be any of several types of data. In some embodiments, location-specific information can be Wi-Fi fingerprint information including a Wi-Fi base station identifier (basic service set identification (BSSID)) and measured signal strength for each respective BSSID. This information can indicate a location of computing device 110 in a particular area. Additionally, Bluetooth beacon technology can similarly be used to indicate the location of computing device 110 in a particular area. These technologies are particularly useful when there might be several devices that a user might wish to control using computing device 110 and it is necessary to determine which device the user is closest to.

In some embodiments, location-specific information can include geographic location information determined through cellular triangulation or GPS coordinates. These technologies might have less resolution than measuring signals from Wi-Fi access points or Bluetooth beacons, especially when indoors, but they can suffice when there is only one device (or limited devices) to control at that location. For example, if the computing device is at the user's home, there might be only one device available to control.

Whatever the type of location-specific information recorded (204), it can be used to establish (206) that location (as indicated by the location-specific information) as the location of the desk phone.

Figure 4:
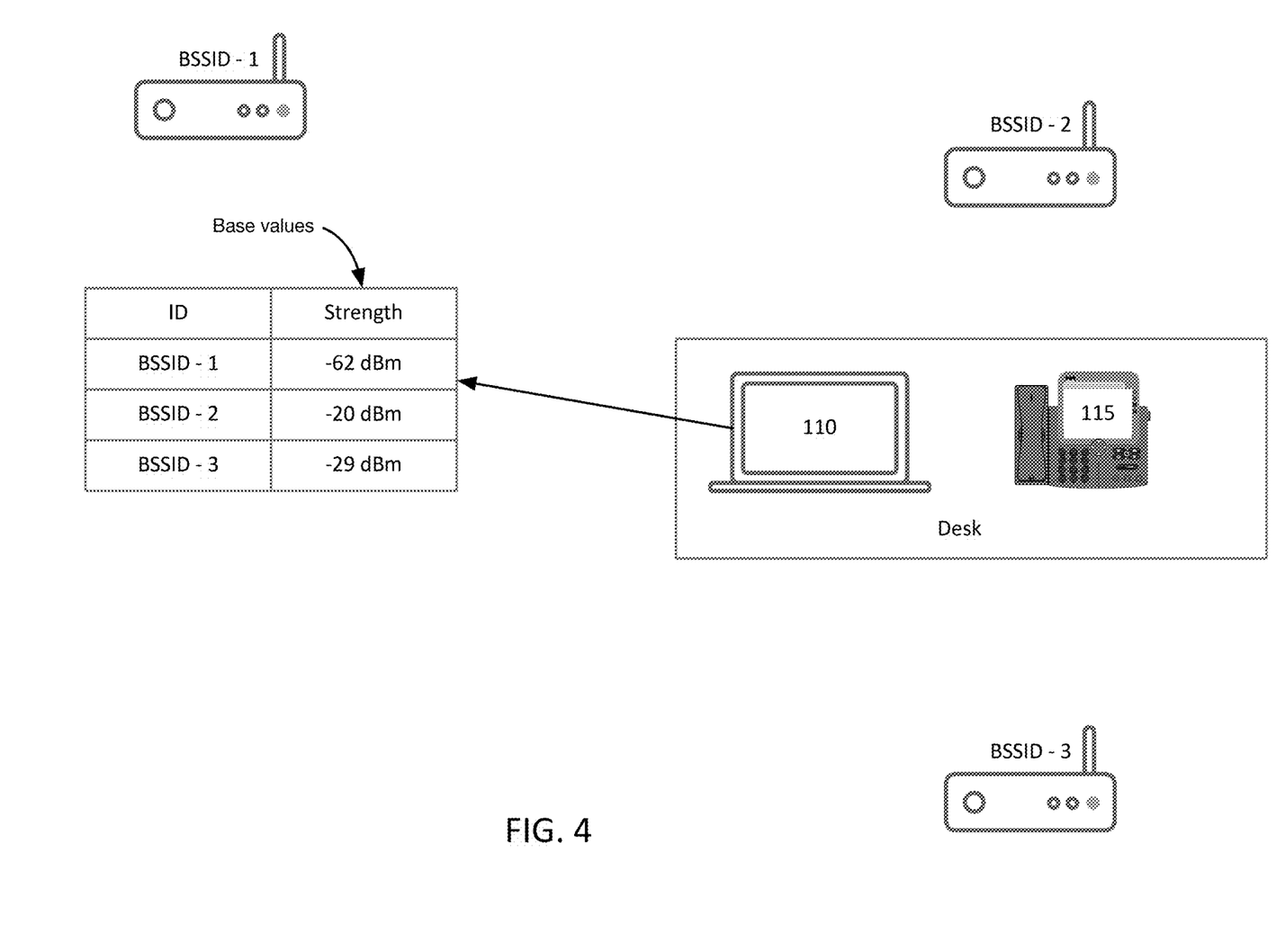
FIG. 4 illustrates an example system embodiment for establishing a base location for a desk phone in accordance with some aspects of the present technology.

FIG. 4 illustrates an example of how location-specific information is used to establish (206) the location of computing device 110 as the location of the desk phone. First, the method relies on the assumption (or an explicit indication or confirmation by a user) that computing device 110 is proximate to desk phone 115. Therefore, computing device 110 can detect BSSIDs from wireless access points in the vicinity and measure the signal strength associated with each BSSID. The presence of the BSSIDs and the associated signal strength can be a descriptor of a base location that is established (206) as the location of the desk phone.

Returning to FIG. 3, at a later time, computing device 110 can detect (208) that a second call is incoming. Again, this can be the result of a notification from CTI Manager 102. Alternatively, the user can be operating computing device 110 to browse a list of contacts, and this can trigger the performance of the rest of the method illustrated in FIG. 3. In yet another alternative, the computing device can periodically perform the rest of the method illustrated in FIG. 3 without any indication that a call is incoming or about to be placed. In another alternative, the computing device can be instructed to perform the method illustrated in FIG. 3 at the user's instruction.

Computing device 110 can record (210) location-specific information indicating the current location of computing device 110, and can determine (212) whether the current location of the computing device 110 is substantially the same as the base location that has been established (206) for desk phone 115 by comparing the current location-specific information with the location-specific information that marks the base location associated with desk phone 115.

When computing device 110 determines (212) that its current location is substantially the same as the location of desk phone 115, it can enable (214) computer-telephony integration controls to control desk phone 115. When computing device 110 determines (212) that its current location is not substantially the same as the location of desk phone 115, it can disable or not-enable (216) computer-telephony integration controls to control desk phone 115.

The location of computing device 110 can be considered to be substantially the same as desk phone 115 when it is considered that computing device 110 is close enough to desk phone 115 that the user can operate it. In some embodiments, this will allow only a small area around desk phone 115. In some embodiments this might allow a radius of 10 feet or so since this would accommodate a big office, and it might be assumed the user can make it to desk phone 115 in a small amount of time. In some embodiments, the area around desk phone 115 that will be considered to encompass the are to be considered substantially the same location as desk phone 115 can be configured by the user or administrator.

Figure 5:
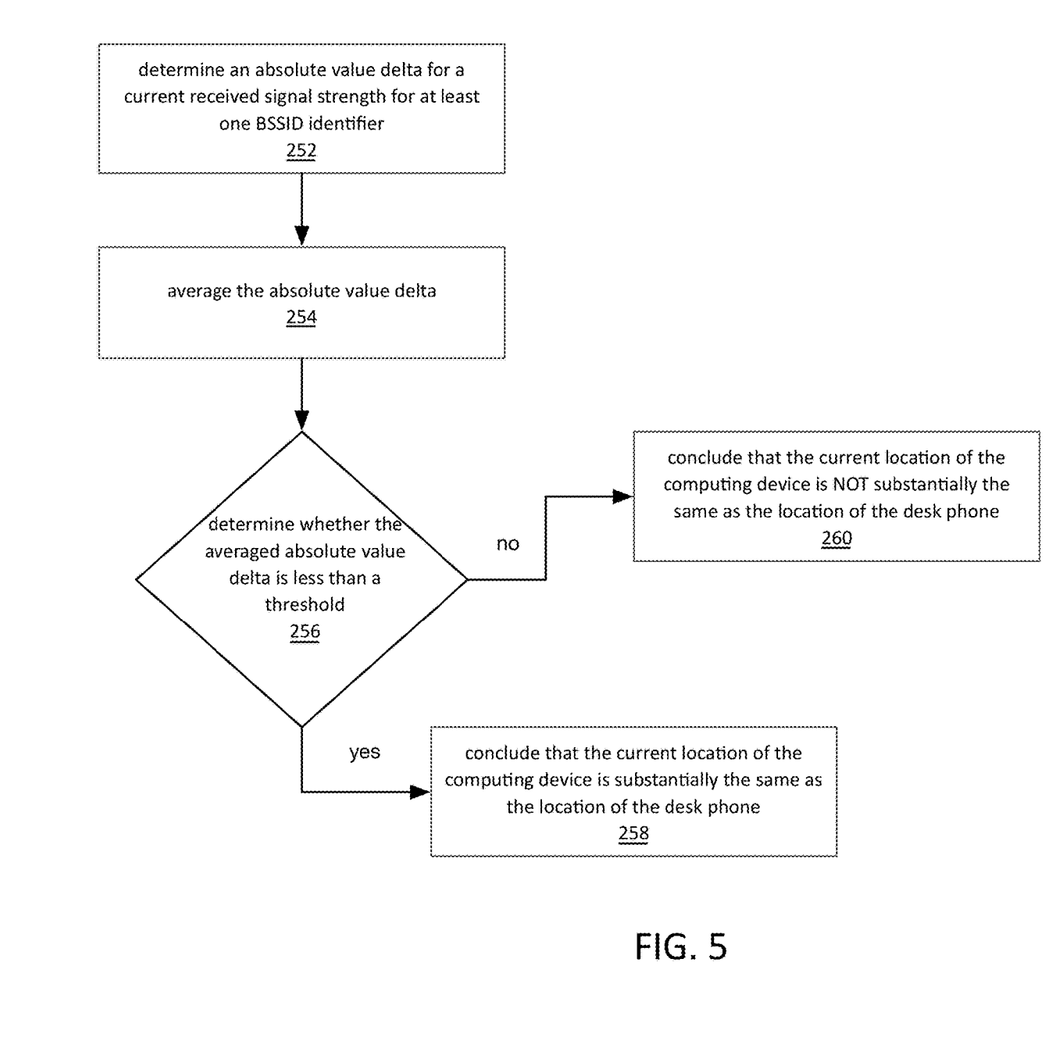
FIG. 5 illustrates an example method embodiment for determining whether a computing device is substantially the same location as a desk phone in accordance with some aspects of the present technology.
Figure 6A:
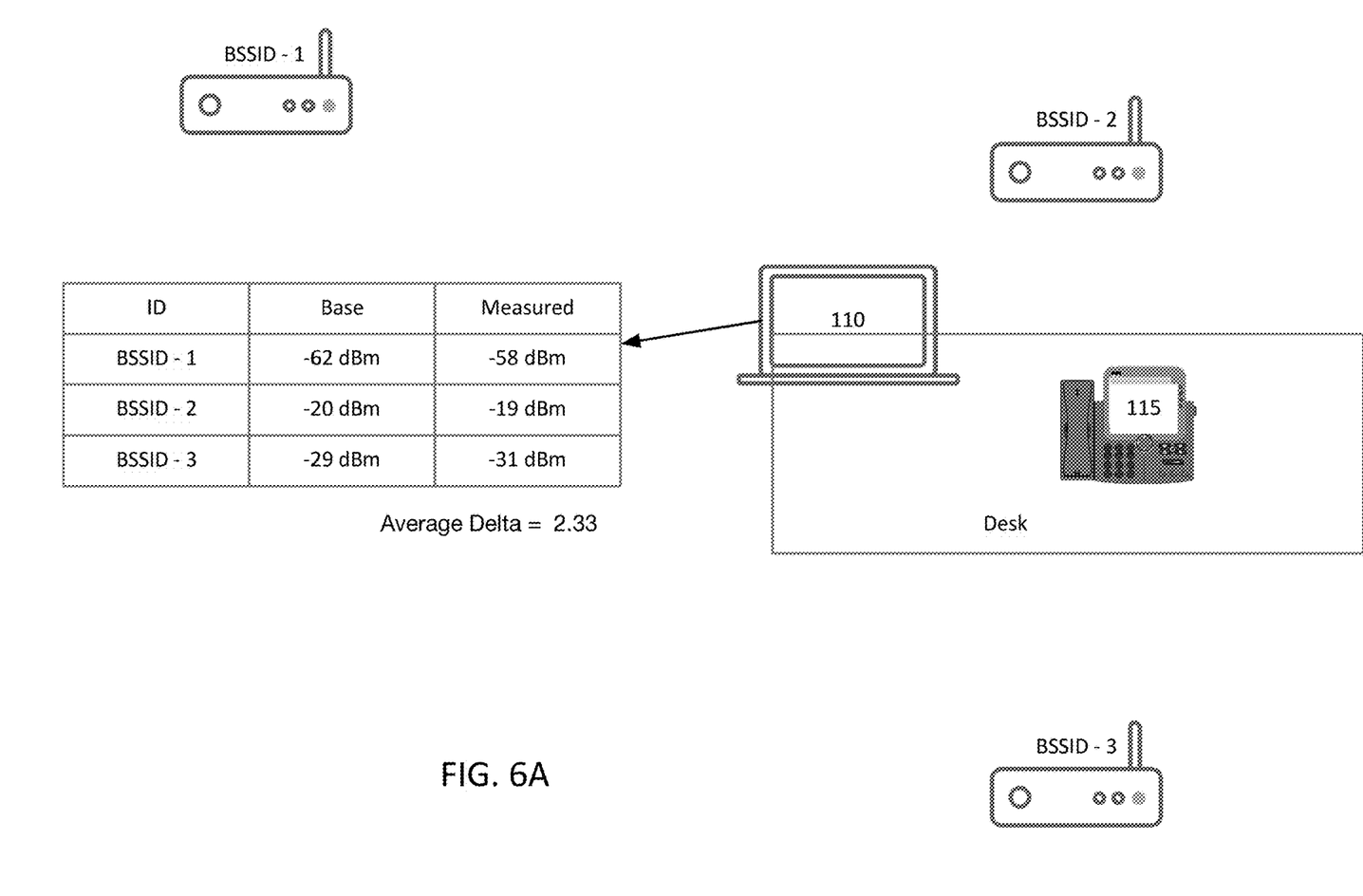
FIG. 6A and FIG. 6B illustrate example system embodiments for determining whether a computing device is substantially the same location as a desk phone in accordance with some aspects of the present technology.
Figure 6B:
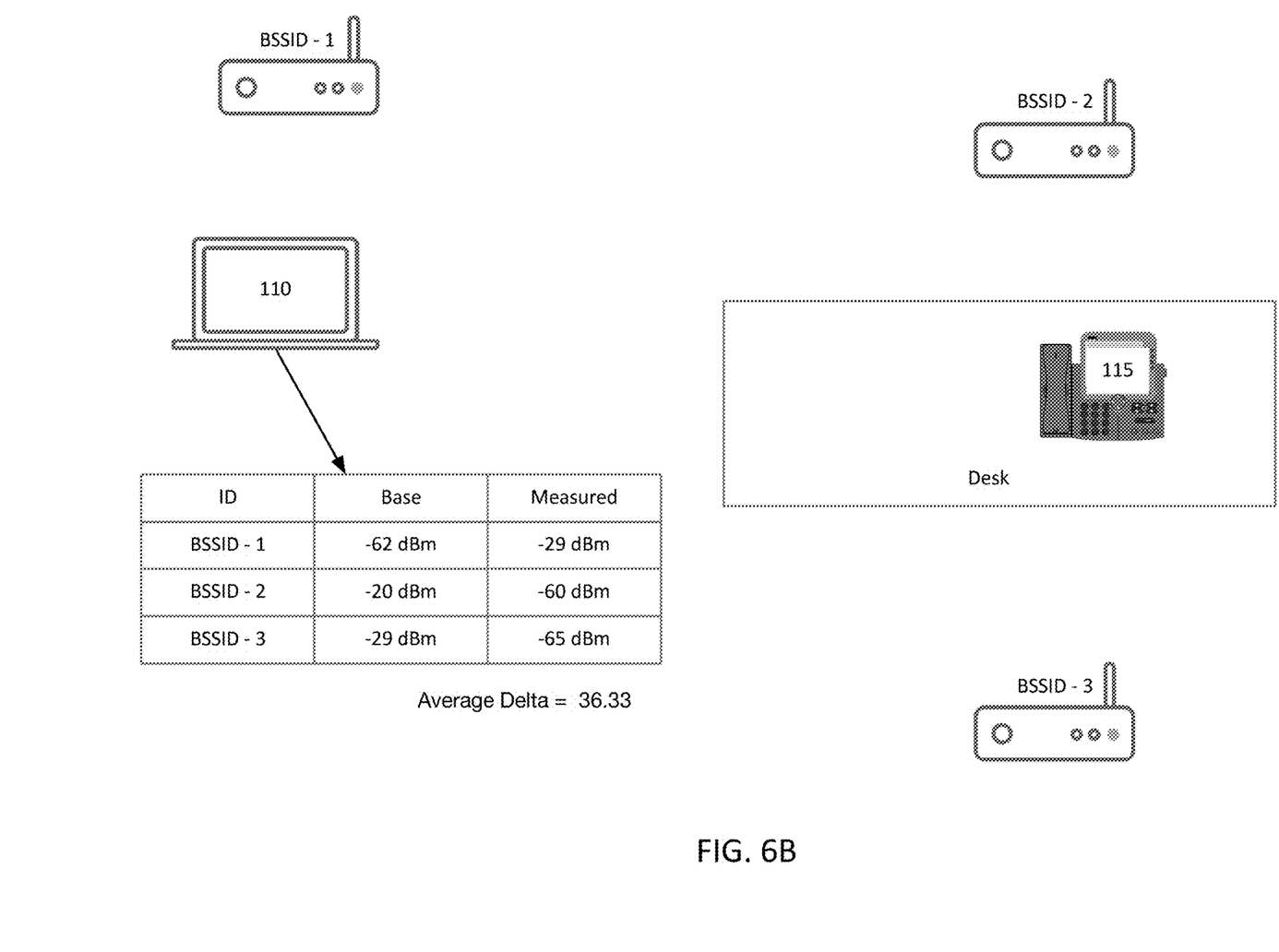

FIG. 5 and FIGS. 6A-6B illustrate an example of how BSSIDs and signal strengths can be used to determine (212) whether computing device 110 and desk phone 115 are in substantially the same location. Computing device 110 determines (252) deltas in measured signal strengths for each respective BSSID. The deltas are turned into absolute values as only the difference in the measured value from the base value matters—it does not matter if a signal is stronger or weaker than the base value. Then computing device 110 averages (254) the absolute value deltas.

Computing device 110 then determines (256) whether the average delta is less than a threshold value. If the average delta is less than a threshold value, computing device 110 concludes (258) that the current location of computing device 110 is in substantially the same location as the desk phone 115. If the average delta is equal to or greater than a threshold value, computing device 110 concludes (260) that the current location of computing device 110 is not in substantially the same location as desk phone 115. Using this methodology, the smaller the threshold value, the smaller the area around desk phone 115 will be considered as being substantially the same location as desk phone 115.

FIG. 6A illustrates an example of computing device 110 concluding (258) that it is in substantially the same location as the desk phone 115. As illustrated in FIG. 6A, computing device 110 is around a desk which supports desk phone 115, and the measured values for each BSSID are relatively close to the base values (see FIG. 4). The average delta in the values is 2.33, and this is considered less than the threshold, and computing device 110 concludes (258) that the current location of computing device 110 is in substantially the same location as the desk phone 115.

FIG. 6B illustrates an example of computing device 110 concluding (260) that it is not in substantially the same location as the desk phone 115. As illustrated in FIG. 6B, computing device is not around the desk which supports desk phone 115, and the measured values for each BSSID are relatively far from the base values (see FIG. 4). The average delta in the values is 36.33, and this is considered greater than the threshold, and computing device 110 concludes (260) that the current location of computing device 110 is not in substantially the same location as the desk phone 115.

In some embodiments, an average delta of less than 10 (ten) can indicate that the current location is substantially the same (258) as location of desk phone 115, and an average value of 10 or greater can indicate that the current location of computing device 110 is not substantially the same (260) as the location of desk phone 115. In some embodiments, the threshold value can be anywhere between 2-20, such that an average delta in this range can indicate that the current location is substantially the same (258) as location of desk phone 115.

While FIG. 6A and FIG. 6B only reflect changes in measurements in signal strength of the detected access points, it should be appreciated that new access points might be detected, or previously detected access points might no longer be detectable. In some embodiments, the presence or absence of an access point that was or was not previously present in the list of access points are not used in the determination (252) of an absolute value delta for the signal strength of each BSSID identifier, and therefore does not contribute to the average (254). However, in order for computing device 110 to conclude that it is at a location at this substantially the same as the location of desk phone 115, at least one access point must be detected that was in the list of access points used to determine the base location of desk phone 115.

While the above technology has been discussed with respect to CTI applications on a computing device for controlling a desk phone, it should be appreciated that the present technology can be used to control any device. For example, in the Internet of Things (TOT)/smart device context, the present technology can be used to determine which device the user wants to control when there are multiple devices to choose from. In such a scenario, there may or may not be an analog to a CTI manager to help configure base location-specific information to establish a location of a device, but this is not necessary. A user could interact with an application to instruct the application to record location-specific information to establish a base location of a specific TOT device. Once the base location of an IOT device is established, the present technology can be used to launch interfaces to control the nearest device. In some embodiments, the present technology can take the form of an IOT launcher interface wherein a user can interact with the IOT launcher interface on the computing device to view a short list of the nearest IOT devices to control. This is especially helpful when a user is in an environment wherein there are many devices within a home or office that are potentially controllable. The present technology would avoid the user having to locate a specific application or specific device by browsing through a long list of applications or devices needed to control a desired device.

Figure 7:
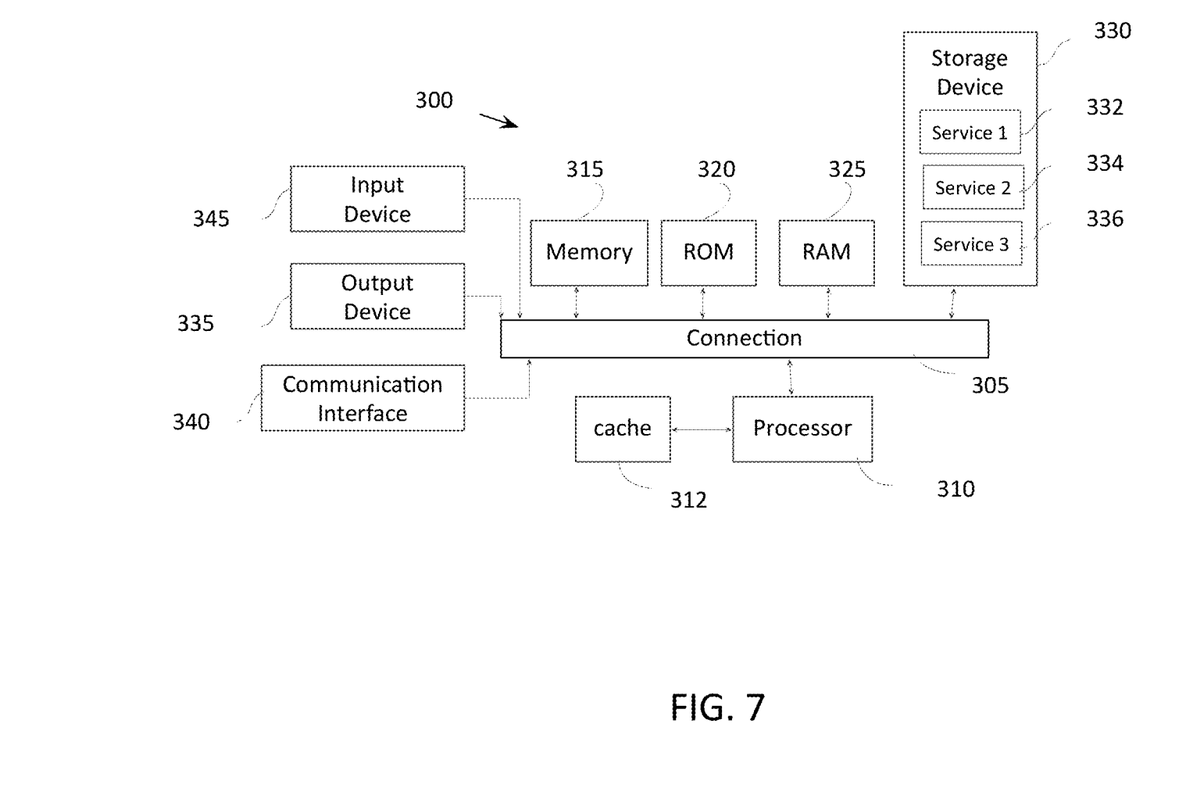
FIG. 7 illustrates an example system embodiment in accordance with some aspects of the present technology.

FIG. 7 shows an example of computing system 300, which can be for example any computing device making up computing device 110 or CTI Manager 102 or any component thereof in which the components of the system are in communication with each other using connection 305. Connection 305 can be a physical connection via a bus, or a direct connection into processor 310, such as in a chipset architecture. Connection 305 can also be a virtual connection, networked connection, or logical connection.

In some embodiments computing system 300 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 300 includes at least one processing unit (CPU or processor) 310 and connection 305 that couples various system components including system memory 315, such as read only memory (ROM) 320 and random access memory (RAM) 325 to processor 310. Computing system 300 can include a cache of high-speed memory 312 connected directly with, in close proximity to, or integrated as part of processor 310.

Processor 310 can include any general purpose processor and a hardware service or software service, such as services 332, 334, and 336 stored in storage device 330, configured to control processor 310 as well as a special-purpose processor where software instructions are incorporated into the actual processor design. Processor 310 may essentially be a completely self-contained computing system, containing multiple cores or processors, a bus, memory controller, cache, etc. A multi-core processor may be symmetric or asymmetric.

To enable user interaction, computing system 300 includes an input device 345, which can represent any number of input mechanisms, such as a microphone for speech, a touch-sensitive screen for gesture or graphical input, keyboard, mouse, motion input, speech, etc. Computing system 300 can also include output device 335, which can be one or more of a number of output mechanisms known to those of skill in the art. In some instances, multimodal systems can enable a user to provide multiple types of input/output to communicate with computing system 300. Computing system 300 can include communications interface 340, which can generally govern and manage the user input and system output. There is no restriction on operating on any particular hardware arrangement and therefore the basic features here may easily be substituted for improved hardware or firmware arrangements as they are developed.

Storage device 330 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 330 can include software services, servers, services, etc., that when the code that defines such software is executed by the processor 310, it causes the system to perform a function. In some embodiments, a hardware service that performs a particular function can include the software component stored in a computer-readable medium in connection with the necessary hardware components, such as processor 310, connection 305, output device 335, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A non-transitory computing-device-readable medium comprising computing-device executable instructions stored thereon, the instructions effective to cause a computing device to:
   at a first time, detect, via a communication through a network from a computer telephone integration (CTI) manager, that a first call has taken place on a desk phone;
   record, at a CTI application running on the computing device, location-specific information indicating a first physical location of the computing device during the first call;
   establish the first physical location of the computing device as a physical location of the desk phone;
   at a second time, record, at the CTI application running on the computing device, location-specific information indicating a current physical location of the computing device;
   compare the current physical location of the computing device with the physical location of the desk phone;
   determine, at the CTI application, whether the current physical location of the computing device is substantially the same as the physical location of the desk phone; and
   in response to the determination that the current physical location of the computer devices is substantially the same as the physical location of the desk phone, enable, CTI controls of the CTI application on the computing device to control the desk phone.

2. The non-transitory computing-device-readable medium of claim 1 wherein the location-specific information includes at least one basic service set identifier (BSSID) for a wireless access point and the received signal strength for the BSSID.

3. The non-transitory computing-device-readable medium of claim 1 wherein the determination that the current location of the computing device is substantially the same as the location of the desk phone occurs when a second call is detected by the CTI application on the computing device offering CTI controls.

4. The non-transitory computing-device-readable medium of claim 1 wherein the desk phone and computing device are endpoints associated with a common phone number on a CTI server.

5. The non-transitory computing-device-readable medium of claim 1 wherein the instructions are effective to cause a computing device to:
do not enable CTI controls on the computing device to control the desk phone when the current location of the computing device is not substantially the same as the location of the desk phone.

6. The non-transitory computing-device-readable medium of claim 1 wherein the location of the computing device is determined to be substantially the same as the location of the desk phone when the computing device is within a configured area around the desk phone.

7. The non-transitory computing-device-readable medium of claim 2 wherein the instructions to determine that the current location of the computing device is substantially the same as the location of the desk phone includes instructions effective to cause the computing device to:
determine an absolute value delta for a current received signal strength for the at least one BSSID identifier;
average the absolute value delta;
determine that the averaged absolute value delta is less than a threshold; and
conclude that the current location of the computing device is substantially the same as the location of the desk phone.

8. A method comprising:
at a first time, detecting, at a computing device via a communication through a network from a computer telephone integration (CTI) manager, that a first call has taken place on a desk phone;
recording, at a CTI application running on the computing device, location-specific information indicating a first physical location of the computing device during the first call;
establishing the first physical location of the computing device as a physical location of the desk phone;
at a second time, recording, at the CTI application running on the computing device, location-specific information indicating a current physical location of the computing device;
comparing the current physical location of the computing device with the physical location of the desk phone;
determining, at the CTI application, whether the current physical location of the computing device is substantially the same as the physical location of the desk phone; and
in response to determining that the current physical location of the computer devices is substantially the same as the physical location of the desk phone, enabling CTI controls of the CTI application on the computing device to control the desk phone.

9. The method of claim 8, wherein the location-specific information includes at least one basic service set identifier (BSSID) for a wireless access point and the received signal strength for the BSSID.

10. The method of claim 8, wherein the determination that the current location of the computing device is substantially the same as the location of the desk phone occurs when a second call is detected by the CTI application on the computing device offering CTI controls.

11. The method of claim 8, wherein the desk phone and computing device are endpoints associated with a common phone number on a CTI server.

12. The method of claim 8, comprising:
not enabling CTI controls on the computing device to control the desk phone when the current location of the computing device is not substantially the same as the location of the desk phone.

13. The method of claim 8, wherein the location of the computing device is determined to be substantially the same as the location of the desk phone when the computing device is within a configured area around the desk phone.

14. The method of claim 9, comprising:
determining an absolute value delta for a current received signal strength for the at least one BSSID identifier;
averaging the absolute value delta;
determining that the averaged absolute value delta is less than a threshold; and
concluding that the current location of the computing device is substantially the same as the location of the desk phone.

15. A system comprising:
at least one processor;
at least one computer-readable medium comprising computer executable instructions stored thereon, the instructions effective to cause the at least one processor to:
at a first time, detect, via a communication through a network from a computer telephone integration (CTI) manager, that a first call has taken place on a desk phone;
record, at a CTI application running on the computing device, location-specific information indicating a first physical location of the computing device during the first call;
establish the first physical location of the computing device as a physical location of the desk phone;
at a second time, record, at the CTI application running on the computing device, location-specific information indicating a current physical location of the computing device; and
compare the current physical location of the computing device with the physical location of the desk phone;
determine, at the CTI application, whether the current physical location of the computing device is substantially the same as the physical location of the desk phone; and
in response to the determination that the current physical location of the computer devices is substantially the same as the physical location of the desk phone, enable, CTI controls of the CTI application on the computing device to control the desk phone.

16. The system of claim 15, wherein the location-specific information includes at least one basic service set identifier (BSSID) for a wireless access point and the received signal strength for the BSSID.

17. The system of claim 15, wherein the determination that the current location of the computer is substantially the same as the location of the desk phone occurs when a second call is detected by the CTI application on the computer offering CTI controls.

18. The system of claim 15, wherein the instructions are effective to cause the at least one processor to:
not enable CTI controls on the computer to control the desk phone when the current location of the computer is not substantially the same as the location of the desk phone.

19. The system of claim 15, wherein the location of the computer is determined to be substantially the same as the location of the desk phone when the computer is within a configured area around the desk phone.

20. The system of claim 16, wherein the instructions to determine that the current location of the computer is substantially the same as the location of the desk phone includes instructions effective to cause the at least one processor:
- determine an absolute value delta for a current received signal strength for the at least one BSSID identifier;
- average the absolute value delta;
- determine that the averaged absolute value delta is less than a threshold; and
- conclude that the current location of the computer is substantially the same as the location of the desk phone.

\* \* \* \* \*